June 19, 1934.  W. C. DUMKE  1,963,436
CLAMP
Filed Jan. 24, 1934
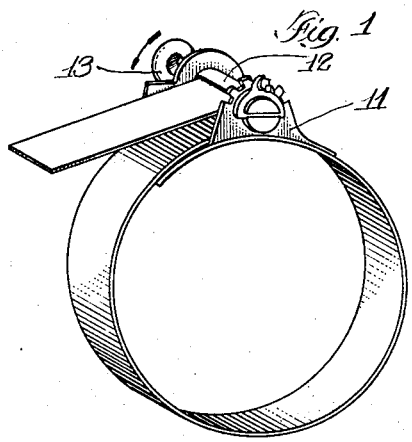
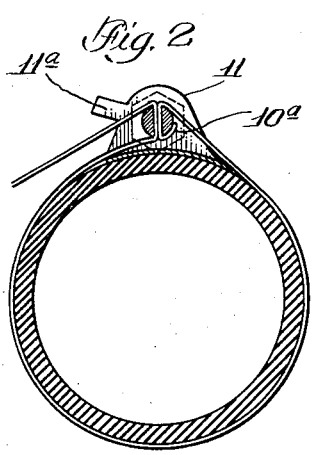
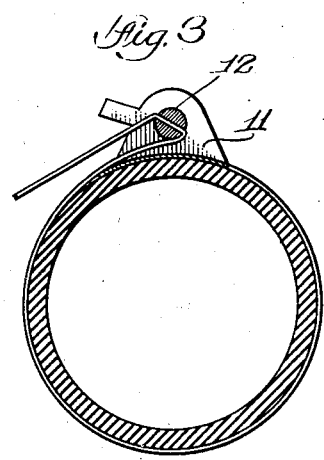
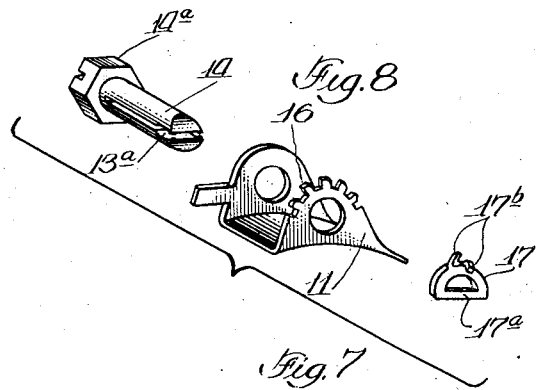
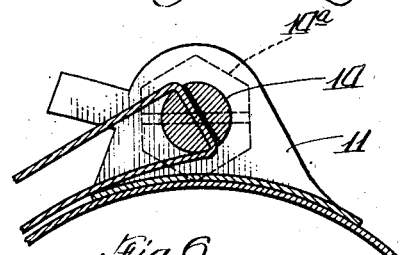
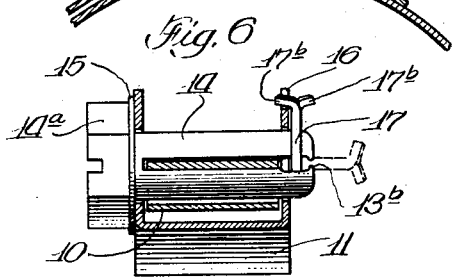
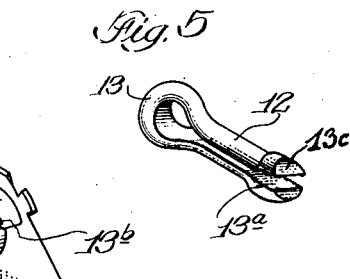
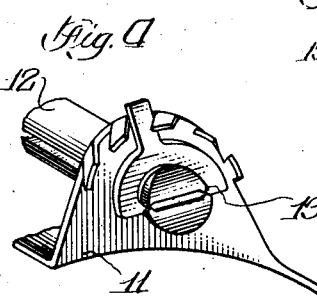
INVENTOR:-
Wm. C. Dumke.
BY Milo B. Stevens & Co.
ATTORNEYS.

Patented June 19, 1934

1,963,436

UNITED STATES PATENT OFFICE 1,963,436

CLAMP

William C. Dumke, Chicago, Ill.

Application January 24, 1934, Serial No. 708,129

13 Claims. (Cl. 24—19)

My invention relates to clamps for articles such as garden hose, automobile radiator connection hose, cotton bales, bundles and other articles which are secured by encircling bands, and my main objects are to provide a band type of clamp which can be easily mounted and removed, adjusted to the required size, securely locked, formed to exert equalized pressure, and constructed simply and inexpensively.

With the above objects in view and any others that may suggest themselves from the specification and claims to follow, a better understanding of the invention may be had by reference to the accompanying drawing, in which—

Fig. 1 is a perspective view of the preferred embodiment of my invention;

Fig. 2 is a section of a modification;

Fig. 3 is a section of a further modification;

Fig. 4 is a perspective view of a modified locking device;

Fig. 5 is a perspective view of the main element in the preferred embodiment;

Fig. 6 is a longitudinal section of a further modification;

Fig. 7 is a cross section of the feature shown in Fig. 6; and

Fig. 8 is a group perspective of the showing in Figs. 6 and 7.

Clamps of the type under consideration, and especially those for clamping automobile radiator hose employ in most cases a bolt and nut to draw the clamp tight, this construction having factors which lower the efficiency of the clamp. For this reason I have evolved the novel clamp with an expedient which eliminates the need of a threaded bolt and nut, substituting a key-type of winding element to draw the clamp tight.

In carrying out the invention, it will be noted in Fig. 1 that the clamp employs a sheet metal band 10 which is formed from a long strip of thin and flexible metal. Near one end of the strip is welded or otherwise secured a shoe 11, having the form of a receptacle. The base of the shoe is elongated in the direction of the longer portion of the band and is longitudinally curved to assume the substantially circular form of the latter when in position on the part clamped.

The longer portion of the band 10 is free before the clamp is applied in order that it may be wrapped around the hose or other part to be clamped after the portion carrying the shoe 11 has been mounted on such part. The free portion is then inserted in the space between the stems 12 of a cotter pin 13, these being journaled in the sides 11 of the shoe. With the parts positioned as in Fig. 1, the free portion of the band 10 is drawn to wrap the band closely about the part to be clamped, the strip from which the band is formed being furnished sufficiently long to adapt the clamp for several sizes of hose or other article for which the particular model of clamp is designed. Thus, the clamp is initially adjustable to the desired size by hand and without the use of appreciable effort.

I employ the principle of the sardine can key to further draw upon the band in order to tightly clamp it to the article. Thus, a pair of pliers or a nail or wire rod can be applied to the head of the cotter pin to turn the same in the direction indicated by the arrow in Fig. 1, whereby to wrap the upper end of the band 10 around the cotter pin and thus draw the band as tightly as desired. In this connection, it will be noted that the short portion of the band which extends from the opposite end of the shoe 11 forms an inside overlap for the band, making the inner surface of the latter practically continuous, whereby to apply uniformly and smoothly to the surface of the article clamped.

The modification in Fig. 2 shows the shoe constituted independently of the strip from which the band is made. Thus, one end of the strip is passed through the cotter pin in the form of a terminal securing hook 10a, while the other is passed through the same from the opposite direction as in the preferred embodiment. It will be apparent that the winding of the cotter pin will draw upon both sections of the strip in order to tighten the band. This form of clamp is preferable where it is desirable to furnish the band material as a plain strip or from a supply roll and the shoe separately.

In the modification in Fig. 3 the shoe 11 is made integrally with the material of the band at one end portion thereof, the other end portion applying to the cotter pin as in the form of Fig. 1. This modification simplifies the clamping because it does away with welding the shoe to the band, although the structure may require a heavier material in order to have the strength of that in Fig. 1, and to stand the winding and clamping strains.

The modification of Figs. 6 to 8 follows the form indicated in Fig. 1, except that the cotter pin is replaced by a bolt type of key 14 having a slotted head 14a which is also hexagonally shaped in outline, so that either a screw driver or a wrench may be applied to the head for turning the key. Fig. 6 shows the insertion of a washer 15 between the head of the key and the wall of the shoe in order to ease the turning of the key. A key of this type is desirable where a heavier construction is necessary, as the bolt type of key is more rigid and sturdy.

Whichever type of winding element may be used for the band, it is necessary that the same be secured or locked at such time as a sufficient pressure is exerted by the clamp. I have indicated one form of locking device in Figs. 1, 6 and 8, the same featuring a formation in one wall of the shoe in cooperation with a device carried by the key.

It will be noted that the shoe wall in question has a part-circular toothed margin 16; also, that the free end of the key is transversely recessed at 13a to provide a bearing for the base 17a of a segmental latch 17 which has two oppositely directed lugs 17b projecting from its periphery. Thus, when the key has been wound to the desired extent, the latch 17 is swung upwardly to the position indicated in Fig. 1 and caught with the corresponding lug 17b in the most convenient notch of the tooth series 16. It is now apparent that two lugs 17b are provided in case the key is stopped on the adjacent half-turn, whereby to place the other one of the lugs opposite the teeth 16. In this connection, it is noted particularly in Fig. 8 that the lugs 17b are obliquely arranged, this construction co-operating with the proper tooth in the series 16 in the manner of a hook as the key tends to unwind to prevent the dislodgment of the latch. Also, the back edges 16a of the teeth 16 on the side facing the latch are preferably rounded so as to permit the proximate lug 17b to trip the teeth with greater ease as the winding is done.

A modification of the teeth 16 and lugs 17 is indicated in Fig. 4. Here it is seen that the teeth are bent out and forward from the side of the shoe to project obliquely from the latter. The latch is extended directly outward from its periphery with the lug, the co-action between the parts being the reverse from the previous instance.

The base 17a of the latch 17 is preferably square in cross section, to fill the space between the key stems when the latch is either in the horizontal or vertical position. The departure of the latch from these positions exerts a separating tension on the key stems, so that the key contributes to the maintenance of the latch in either of its proper positions. At the entrance to the key the sides of the stems are extended with meeting lugs 13b, as shown in Fig. 4, to prevent the latch from sliding out of the key; also, the stems are externally rounded at the ends, as shown at 13c, for clearance when the latch is swung.

I have extended the remote wall of the shoe 11 with a lug 11a which is bendable upon the issuing or excess portion of the band to tuck the same into the space between the lug walls and keep it close to the clamp. Thus, the operative zone of the clamp is comparatively compact, this also being due to the fact that the key 12 can be placed close to the base of the shoe in contradistinction with the relatively high position necessary for the bolt and nut in clamps of conventional types.

To remove the clamp, the key is given a slight turn in the tightening direction, which will release the grip of the lugs 17b on the teeth 16. Now the latch can be swung out to extend directly from the key, and the latter turned in the reverse or unwinding direction to pay out the wound portion of the band and permit the latter to release the article clamped.

It will be seen from the above description that I have provided a clamp which is relatively simple in construction, yet powerful and easy to apply and remove. The low position of the key also provides a straight or more direct pulling angle for the drawn portion of the band. The present clamp enables a thin material to be used for the band which renders it more easily conformable to the curvature of the hose or other article clamped and yields more readily to the tightening pull. Also, by the use of a thin metal for the clamp, it is easy to unwind and straighten the band out for use at other times on an article of a different girth or diameter.

I claim:

1. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said member being longitudinally-slitted and with a head portion at one end, and said latch means being carried in the slit at the other end.

2. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said member being longitudinally-slitted and with a head portion at one end, and said latch means being perforated to receive one section of said member and seat in the slit at the other end of the latter.

3. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said member being longitudinally-slitted and with a head portion at one end, and said latch means being perforated to receive one section of said member and seat in the slit at the other end of the latter, the latch being formed with a base having flat sides engaging the inner sides of the member sections.

4. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said member being longitudinally-slitted and with a head portion at one end, and said latch means being perforated to receive one section of said member and seat in the slit at the other end of the latter, the latch being formed with a base having flat sides engaging the inner sides of the member sections, the latter having a contracting tendency upon said sides.

5. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said member being longitudinally-slitted and with a head portion at one end, and said latch means being perforated to receive one section of said member and seat in the slit at the other end of the latter, the latch being formed with a base having a substantially square cross section whereby to have two opposite sides of the base engaging the inner sides of the member sections when the latch is in the position transverse of the member and in a position extended from the same, the member sections having a contracting tendency to maintain the latch in either of the positions mentioned.

6. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said latch means being carried in the slit at one end of the member and pivotally applicable for engaging said stop means.

7. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said latch means being carried in the slit at one end of the member and swingable on an axis transverse of the member toward said stop means to engage the same.

8. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said latch carrying a lug, and said stop means comprising a series of teeth, said lug being the element immediately engageable with a selected one of said teeth on the rotation of the member.

9. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said latch carrying a lug, and said stop means comprising a series of teeth, said lug being the element immediately engageable with a selected one of said teeth on the rotation of the member and being obliquely directed to form a hook from said engagement.

10. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said latch being swingable in one end of the member on an axis transverse of the same whereby to reach portions of said member on opposite sides of said axis, and lugs extended from the latch to form immediate engaging elements with said stop means, the lugs being oppositely directed from each other for alternative application to said stop means dependent upon that side of the member upon which the latch is swung at a corresponding point in the rotation of the member.

11. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said member being longitudinally-slitted and with a head portion at one end, said latch means being carried in the slit at the other end, and guard extensions at such other end of the member to retain the latch means in the slit.

12. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said member being a cotter pin with its sections separated at their free ends to form a recess, said latch means having a base seating in said recess.

13. A clamp comprising a band, a support carried by one end portion of the latter, a rotatable member mounted in the support and adapted to wind the other end of the band whereby to contract the latter, latch means carried by the member, and selective stop means carried by the support and engageable by the latch means, said member being a cotter pin with its sections separated at their free ends to form a recess, said latch means having a base seating in said recess and being perforated to swing under the sections, the free ends of the latter being rounded in the direction of the same to provide a clearance for the latch means.

WILLIAM C. DUMKE.